United States Patent [19]

Mallia et al.

[11] Patent Number: 4,778,778
[45] Date of Patent: Oct. 18, 1988

[54] PROCESS FOR THE PRODUCTION OF SINTERED ALUMINUM NITRIDES

[75] Inventors: Robert A. Mallia; Carl V. Cox, both of Tucson, Ariz.

[73] Assignee: Keramont Advanced Ceramic Products Corporation, Tuscon, Ariz.

[21] Appl. No.: 57,623

[22] Filed: Jun. 3, 1987

[51] Int. Cl.$^4$ .................. C04B 35/58; C04B 35/64
[52] U.S. Cl. ............................ 501/96; 501/98; 501/153; 264/65; 264/66
[58] Field of Search ................ 501/96, 98, 153; 264/65, 66

[56] References Cited

U.S. PATENT DOCUMENTS

| 3,108,887 | 10/1963 | Lenie et al. | 501/96 |
| 3,930,787 | 1/1976 | DeHollander et al. | 264/65 |
| 4,350,651 | 9/1982 | Morell et al. | 264/65 |
| 4,547,471 | 10/1985 | Huseby et al. | 501/98 |
| 4,618,592 | 10/1986 | Kuramoto et al. | 501/96 |

FOREIGN PATENT DOCUMENTS 0153737 4/1985 European Pat. Off. .
0166073 2/1986 European Pat. Off. .
1100865 7/1965 United Kingdom .

Primary Examiner—William R. Dixon, Jr.
Assistant Examiner—David M. Brunsmon
Attorney, Agent, or Firm—Bryan, Cave, McPheeters & McRoberts

[57] ABSTRACT

Process for producing sintered aluminum nitride bodies, comprising sintering a relatively impure aluminum nitride powder comprising at least 95% by weight aluminum nitride and having no more than 3% bound oxygen content, no more than 0.6% metal or metal compound impurities, and no more than 0.5% silicon or carbon impurities, the sintering being carried out by heating the aluminum nitride body from room temperature to the sintering temperature at a rate of no more than 250° C. per hour; introducing an inert gas containing from 1 to 4% by volume hydrogen until the temperature reaches 1200° C.; continuing to introduce solely an inert gas as the temperature is further increased to the sintering temperature; sintering the body at a sintering temperature of from 1600° to 1900° C.; and cooling the sintered body at a rate of no more than 300° C. per hour.

14 Claims, 2 Drawing Sheets

PROCESS FOR THE PRODUCTION OF SINTERED ALUMINUM NITRIDES

FIELD OF THE INVENTION

The present invention relates to a process for the preparation of sintered aluminum nitrides which are suitable for use as substrates for integrated circuits and in other electrical devices.

More particularly, the present invention relates to the production of sintered aluminum nitride bodies having high thermal conductivity, good consistency, i.e., uniform color, uniform physical properties, e.g., uniform mechanical properties such as flexural strength, excellent sintered density, and uniform shrinkage.

BACKGROUND OF THE INVENTION

It is well known in the semiconductor art to use sintered aluminum nitride for insulating substrates because of its thermal conductivity. Many methods are known for preparing aluminum nitride powders which may be used for preparing sintered bodies having such properties. The two principal methods used for this purpose involve the direct nitriding of metallic aluminum powder at high temperature, in an atmosphere of nitrogen or ammonia gas, followed by milling the resulting nitride (see, for example, U.S. Pat. No. 3,108,887); and reducing alumina by firing alumina and carbon powder in nitrogen or ammonia gas, and thereafter pulverizing the resulting nitride (see, for example, U.K. Patent No. 1,100,865).

The first method is disadvantageous in that the resulting nitride can contain a large amount of impurities such as metallic aluminum or various metallic compounds. Generally, these impurities originate in the raw aluminum powder reactant, and/or from the pulverizing step.

In the second method there is always a large amount of oxygen present, generally from 2 to 5% by weight or more. The oxygen is present as unreacted alumina or other metallic oxides. It is known that the presence of these impurities drastically affects the properties of the sintered aluminum nitride body; in particular, the thermal conductivity decreases to such an extent that sintered aluminum nitride thus produced cannot be used as a substrate for most electronic components.

Various sintering cycle modifications have been proposed in the processing of aluminum nitrides, e.g., modifications in sintering temperatures, programmed increases from room temperatures to the sintering temperature (ramp temperature), and post-sintering cooling cycles. According to the prior art, notwithstanding changes in sintering cycles, the properties of the sintered bodies depend upon the properties of the initial AlN powder.

It is also known from Kuramoto et al. U.S. Pat. No. 4,618,592 that high purity aluminum nitride powders may be prepared by alumina reduction without using a pulverizing step, in an effort to obtain sintered bodies having high density and high thermal conductivity. According to this patent it is essential that aluminum nitride powders thus utilized possess an average particle diameter of not more than 2 microns, comprise at least 97% by weight aluminum nitride, and contain at most 1.5% by weight of bound oxygen; at most 0.5% by weight (calculated as metal) of metal or metal compound impurities, wherein at most 0.1% by weight of the metal is iron, chromium, nickel, cobalt, copper, zinc or titanium; or at most 0.5% by weight (calculated as carbon or silicon compounds) of carbon or silicon. According to the Kuramoto patent, it is not possible to obtain an aluminum nitride sintered body having good thermal conductivity and other properties without using such a high purity aluminum nitride powder.

More recently, it has been found that employing a particular sintering cycle, sintered aluminum nitride bodies having high thermal conductivities may be prepared, even without the use of aluminum nitride reactants having the relatively high purities required by Kuramoto. Such cycle involves:

(a) increasing the temperature of a compacted aluminum nitride body from room temperature to the sintering temperature (the ramp temperature) at a rate of no more than 250° C. per hour;

(b) sintering the body in an inert atmosphere at a temperature between about 1600° and 1900° C. and (c) thereafter cooling the sintered body at a rate of no more than 300° C. per hour.

The aforesaid sintering cycle is more fully described in copending Cox et al U.S. patent application Ser. No. 5,475 filed on Jan. 20, 1987 [KP. 3611; 2427-130-AP-00], owned by the assignee of the present invention; the disclosure of said application is incorporated herein by this reference.

It is among the objects of the present invention to provide an improved process for the production of sintered aluminum nitride bodies suitable for use as substrates for integrated circuits, or for other electrical components. The present process, like the process of the aforesaid Cox et al application, may utilize relatively impure aluminum nitride powders, and yet produce sintered bodies having high densities, thermal conductivities and other desired properties.

SUMMARY OF THE INVENTION

In accordance with the present invention, an improved process for producing sintered aluminum nitride bodies is provided, which comprises;

(a) mixing an aluminum nitride powder with a sintering aid, the powder having a surface area of at least about 2.5 $m^2/g$, comprising at least about 95% by weight aluminum nitride, and incorporating impurities in no more than the following amounts:

(i) a bound oxygen content of no more than about 3% by weight;

(ii) metal or metal compounds in an amount of no more than about 0.6% by weight (calculated as the metals), including iron or iron compound impurities in an amount of no more than about 0.35% by weight (calculated as iron), and/or other metal impurities in an amount of no more than about 0.1% by weight per individual metal (calculated as the metal); and (iii) silicon or carbon or compounds thereof in an amount of no more than about 0.5% by weight (calculated as carbon or silicon);

(b) compacting the mixture to form an aluminum nitride body; and (c) subjecting the body to the following sintering cycle:

(i) increasing the temperature from room temperature to the sintering temperature at a rate of no more than about 250° C. per hour;

(ii) introducing an inert gas containing from about 1 to 4% by volum hydrogen until the temperature reaches about 1200° C.;

(iii) continuing to introduce solely an inert gas as the temperature is further increased to the sintering temperature;
(iv) sintering the body at a sintering temperature between about 1600° and 1900° C.; and
(v) cooling the sintered body at a rate of not more than about 300° C. per hour.

It has been found that by thus introducing a hydrogen/inert gas mixture during the ramp temperature cycle, second phase (non-aluminum nitride) materials, e.g., yttria, in the grain boundaries of the sintered aluminum nitride bodies are substantially reduced, if not eliminated. It is believed that the addition of a small proportion of hydrogen during the ramp temperature cycle may more effectively eliminate binder during sintering, facilitate use of the yttria as a sintering aid, and thereby prevent the formation of or eliminate a second phase. It will, however, be understood that the invention is not limited to this proposed mechanism. Whatever the explanation, it has been found that use of the present process produces more homogeneous aluminum nitride bodies which exhibit higher thermal conductivities than sintered aluminum nitride ceramics otherwise prepared, and thereby facilitates the use of aluminum nitride powders of lesser purities than heretofore required for the preparation of substrates for electronic components.

The sintered bodies produced by the present process are translucent (which, as used herein, embraces transparent bodies as well), exhibiting the various advantages ascribed to translucent aluminum nitride ceramics in the art.

BRIEF DESCRIPTION OF THE DRAWING

The nature and advantages of the aluminum nitride sintered bodies prepared by the process of the present invention will be more apparent from consideration of the following detailed description, considered in connection with the accompanying drawing, in which.

DESCRIPTION OF THE PREFERRED EMBODIMENTS

Figure 1:
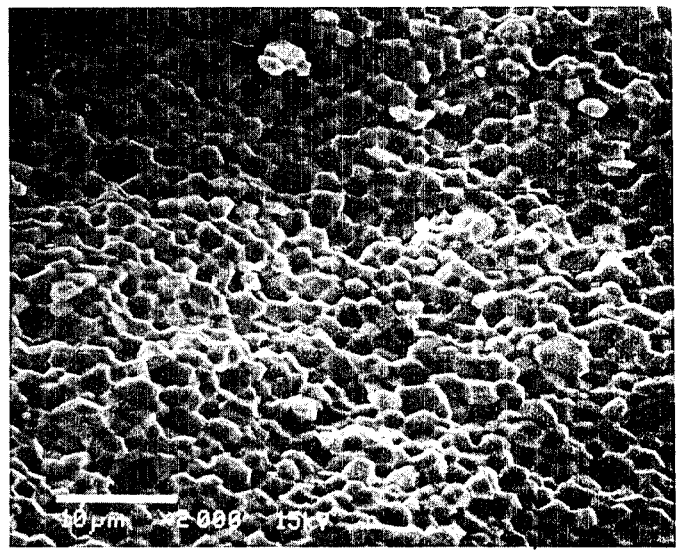
FIG. 1 is a scanning electron photomicrograph of the mechanically fractured surface of an aluminum nitride sintered body produced in accordance with the preferred embodiment of the invention described below, viewed at 2000×magnification.

Aluminum nitride sintered bodies are prepared in accordance with the present invention from aluminum nitride powders which, as indicated above, have surface areas of at least about 2.5/m² gram preferably about 4–7 m²/gram. The surface area of the aluminum nitride powder is measured by conventional B.E.T. absorption methods. Generally, with the above surface areas the average agglomerate diameter of the aluminum nitride powder ranges from about 1 to 5 microns. However, as recognized in the art, the actual crystal diameter is much smaller.

As noted, aluminum nitride powders may be utilized in the present process notwithstanding the presence of impurities including bound oxygen contents of up to about 3%, preferably no more than about 2.5%, by weight; iron or iron compound impurities in an amount of up to about 0.1% by weight; carbon, silicon or compounds thereof, in aggregate amounts of no more than about 0.5% by weight, preferably up to about 0.15% by weight of carbon or carbon compounds and up to about 0.1% by weight of silicon or silicon compounds, respectively. In addition to iron or iron compounds, other metal or metal compound impurities may be present in the aluminum nitride powder in amounts, which aggregate together with any iron impurities, up to about 0.6% by weight, each individual metal or metal compound being present in an amount of no more than about 0.1% by weight of the powder.

Aluminum nitride powders meeting these specifications may be prepared from either metallic aluminum or alumina, utilizing the techniques described hereinabove. Commercially available materials which are useful in the process hereof are available, for example, from Starck (e.g., as its Grade C Aluminum Nitride Powder), Denka (as, for example, its Grade AP 10 Aluminum Nitride Powder), Tokuyama Soda (as, for example, its Grade F or Type G Aluminum Nitride Powders), or Toshiba.

The initial AlN powder can also be obtained by mixing various commercial aluminum nitrides as described, for example, in Mallia et al U.S. application Ser. No. 5,476 filed Jan. 20, 1987, which application is owned by the assignee of the present invention and the disclosure of which is incorporated by this reference herein.

Desirably, the powder is initially dry screened as received and/or after milled, in general with a 35 mesh screen, to remove metallic Al or other large debris or impurities. The screening may, desirably, be carried out as described in the aforesaid copending Mallia et al U.S. application Ser. No. 5,476, and in Mallia et al U.S. application Ser. No. 4,951 filed Jan. 20, 1987, which application is also owned by the assignee of the present invention; the disclosures of both of these applications are incorporated by this reference herein.

The aluminum nitride powder is mixed with any of the art-recognized sintering aids such, for example, as the oxides or fluorides of metals selected from the group of yttrium, the rare earth metals (lanthanum, cerium, praseodymium, neodymium, samarium, gadolinium, dysprosium, etc.) the alkali earth metals(Ca,Sr, Ba) and, preferably, oxides or nitrates of yttrium or calcium. These sintering aids are described, for example, in European Patent Application Nos. 153,737 and 166,073 and in U.S. Pat. No. 3,108,887. The sintering aid is preferably admixed with the aluminum nitride powder in an amount of from about 0.05 to 10% by weight, desirably in an amount of from about 0.5 to 3.0% by weight. The sintering aid has a surface area of, preferably, between about 6.0 and 8.0 m²/g. Preferably, the ratio of surface area of the sintering aid to that of the aluminum nitride powder is about 2:1 to 4:1, desirably about 2.9:1.

Homogeneous mixing of the aluminum nitride with the sintering aid is carried out, for example, by using conventional dry and wet ball milling. In general, this is achieved by using a grinding aid, for example, glycerol trioleate, Menhaden fish oil, or others.

Some organic binders may also be used during processing of the ceramic powder. Binders so useful are well known in the art, and comprise high molecular weight organic materials which are soluble in organic solvents, such as industrial waxes, e.g., paraffin, ceresine, ozokerite or highly viscous polyglycols, PMMA, PVA or polyvinyl formal or butyral. Such binders are known to have bonding and lubricating properties which, under forming pressure, allow the grains of material to glide on each other into the relative positions which produce a highly compact body.

The binders can also be mixed with suitable plasticizers, organic substances which are well known in the art for improving the flexibility and reducing the viscosity of the binders. For example, plasticizers commonly used with polyvinylbutyral are the phthalates, phosphates, polyethyleneglycol ethers, glycerol monooleate, petrolatum, ricinoleate, sebacates, citrates, and castor oils, while those used for polyvinyl formal binders comprise dibenzoate, chlorinated naphthalenes, furfuryl oleate, or glycolate adipate.

The aluminum nitride body is thereafter formulated by a suitable agglomeration technique. Conventional techniques, e.g., solvent spray drying with acetone or the like, may be so utilized.

Figure 2:
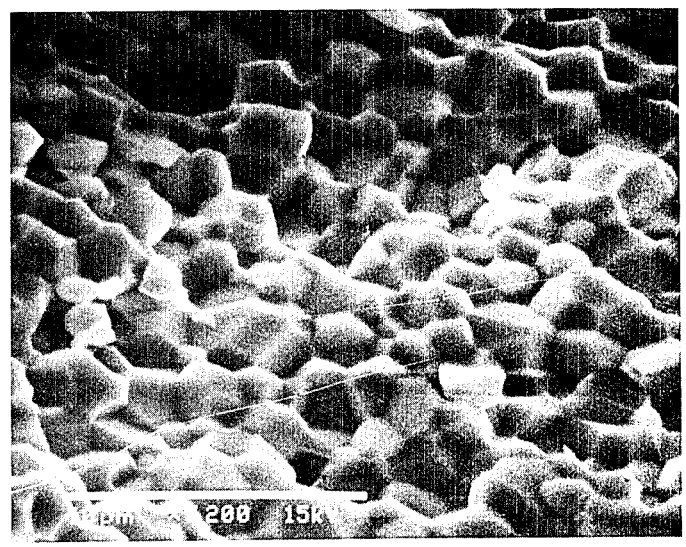
FIG. 2 is a scanning electron photomicrograph of the mechanically fractured surface of the aforesaid aluminum nitride sintered body, viewed at 5,200×magnification.
Figure 3:
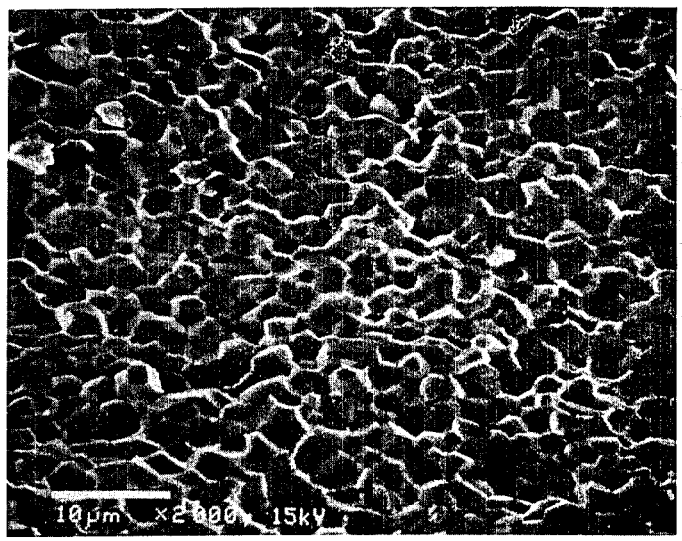
FIG. 3 is a scanning electron photomicrograph of a mechanically fractured surface of an aluminum nitride sintered body produced by the technique of the control experiment described below, without use of a hydrogen/inert gas mixture during the ramp temperature stage of the sintering cycle, photographed at the same magnification (2000×) as FIG. 1.
Figure 4:
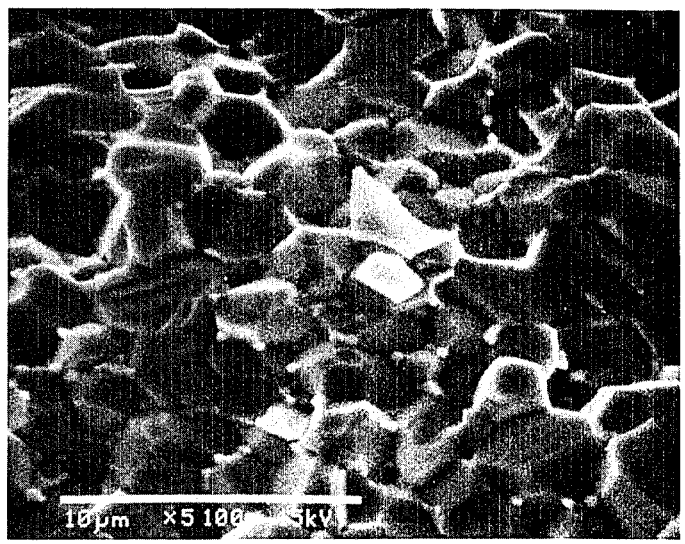
FIG. 4 is a scanning electron photomicrograph of the mechanically fractured surface of the aluminum nitride sintered body produced by the control procedure, photographed at 5,100 X magnification.

The green body is then subjected to the sintering cycle of the present invention. In particular, as the aluminum nitride body is initially heated a hydrogen/inert gas mixture is introduced at temperatures of up to about 1200° C., preferably at temperatures of from room temperature to about 800° C. The hydrogen/inert gas mixture contains hydrogen in an amount less than that which would pose any risk of explosion. Amounts of up to about 4%, preferably from about 1 to 3%, hydrogen by volume are thus admixed with the inert gas, e.g., nitrogen or argon. The presence of the small proportion of hydrogen facilitates the removal of any second phase material from the aluminum nitride matrix; this may be seen by comparison of the photomicrographs of FIGS. 1 and 2, as compared with FIGS. 3 and 4, as discussed more fully below.

Thermodynamic equilibria calculations indicate that the hydrogen/inert gas atmosphere may be maintained up to temperatures of at least about 1200° C. without substantial reaction of the hydrogen with the aluminum nitride composition. At the same time, the ramp temperature is increased at a rate between about 10° to 200° C. per hour, preferably at a rate of from about 20° to 80° C. per hour.

When the temperature in the sintering zone reaches the indicated level (about 1200° C., preferably 800° C.), the atmosphere in the sintering zone is changed to pure inerts and the inert gas (or mixture of inert gases) is introduced, preferably under dynamic conditions, e.g., with nitrogen at a rate of about 2-3 SCFH and under a pressure of about 10-20 psig, or at whatever rate is necessary to assure from about 20-30 changes of the furnace atmosphere per hour.

The aluminum nitride body is thereafter sintered at sintering temperatures within the range of from about 1600° to 1900° C., preferably at from about 1770° to 1850° C., and most desirably at a sintering temperature ranging from about 1810° to 1830° C. Sintering is thus effected for about 3 hours, preferably for about 3-10 hours, and most desirably for about 6-7 hours.

Sintering is carried out utilizing a closed aluminum nitride boat, sagger, plat or other container known to be useful in sintering operations. A boat of graphite coated with aluminum nitride can be used in order to prevent any diffusion of impurities into the body to be sintered. Boats of other high purity materials such as boron nitride, aluminum oxide, etc. can be also utilized in the process hereof. Generally, the boat employed is closed with a lid made of the same substances indicated above.

Finally, the sintered bodies are cooled at a rate of no more than about 300° C. per hour, preferably between about 100°-275° C. per hour.

By combining use of the various conditions noted above, it has been found that sintered aluminum nitride bodies having increased thermal conductivities may be produced from ultra pure aluminum nitride powders, such, for example, as the powders described in the aforesaid U.S. Pat. No. 4,618,592, and that sintered bodies having thermal conductivities adequate for use as substrates for electronic components or the like, may be produced from aluminum nitride powders of lesser purities.

The following example and control experiment illustrate the improved results obtained utilizing the process of the present invention:

EXAMPLE PREPARATION OF AN ALUMINUM NITRIDE SINTERED BODY USING THE SINTERING CYCLE OF THE INVENTION

Tokuyama Soda Grade F aluminum nitride powder was used as an initial reactant. The chemical composition of the powder was as follows:

|    | Weight %       |
|----|----------------|
| Al | 65.50          |
| N  | 33.30          |
| O  | 1.08           |
| C  | .092           |
| Y  | less than 0.001 |
| Fe | less than 0.001 |
| Mg | less than 0.001 |
| Ni | less than 0.001 |
| Si | less than 0.001 |

Nitrogen content was measured by the Kjeldahl method, oxygen and carbon were measured by IR spectroscopy of the sample decomposition gases and metals, and all other constituents were determined by the inter-coupled plasma technique.

The surface area of the aluminum nitride powder was 3.15 m$^2$/gm. The bulk and tap densities of the powder were 0.25 and 0.60 gm/cc, respectively.

50 kg of the powder was dry screened with a 35 mesh stainless steel sieve to remove metallic Al and other large debris or impurities. The AlN powder was then admixed with 2% by weight $Y_2O_3$ as a sintering aid (Union Molycorp 99% yttrium oxide, having a surface area of 14.2 m$^2$/gm.), and 1% by weight of commercially available glycerol trioleate as a grinding aid. This mixture was then dry milled in 3 kg portions for 3 hours in 5 gal. polypropylene jars (at 65% of critical speed) with 18 kg of 85% $Al_2O_3$ rod grinding media ½ inch in diameter by ½ inch in length.

The bulk and tap densities of the milled powder were 0.78 and 1.27 gm/cc, respectively. The powder was separated from the grinding media with a ⅛ inch polypropylene sieve.

The thus dry milled powder was subsequently mixed with 2% by weight polyvinyl butyral (Monsanto's BUTUAR Grade B76) as a binder, 27% by weight 2-ethylhexyl diphenyl phosphate (Monsanto's SANTICIZER Grade S141) as a plasticizer, and 100% by weight acetone as a solvent, in a Cowles dissolver. (All the weight %'s are expressed on a powder basis). The mixture was then spray dried in a conventional closed cycle, N₂ atmosphere solvent spray dryer with rotary atomization at 10,000 rpm.

The resulting powder had bulk and tap densities of 1.07 and 1.24 gm/cc, respectively, and an agglomerate size of 90% less than 162 microns, 50% less than 88 microns and 10% less than 36 microns.

The spray dried powder contained 63.0% Al, 31.0% N, 3.10% C (mostly binder), 1.60% O, 1.42% Y, 0.051% Si, 0.010% Mg, 0.006% Fe, and 0.001% Ni.

The powder was uniaxially cold pressed in a conventional dry press to a 1.990 gm/cc green density, as calculated from dimensions and weight.

The compacted product was then close packed inside a closed AlN sagger and sintered in a graphite resistance element furnace. The temperature program during the sintering cycle was as follows: 25° C./hr to 800° C., 33° C./hr to 1000° C., 80° C./hr to 1500° C., 300° C./hr to 1800°, soak for 6 hrs, cooldown at 140° C./hr. The atmosphere program during the sintering cycle was as follows: static air for 2 hrs., evacuation to 28 inches Hg, backfill with 98% N₂/2%H₂ to 2-3 psig and 45 SCFH to 800° C., then addition of N₂ only at 2-3 psig and 45 SCFH to 1000° C., then 9 psig and 45 SCFH N₂ only to 1500° C., then 9 psig without any further addition of gas to 1800° C. and, finally, resumption of 45 SCFH N₂ flow at 1500° C., during the cooldown.

The resulting ceramic was near white in color and was translucent. As may be seen in FIGS. 1 and 2 of the drawing, no second phase material was visible in the grain boundaries. The sample was too thin to accurately measure thermal diffusivity.

CONTROL

PRODUCTION OF AN ALUMINUM NITRIDE SINTERED BODY WITHOUT THE ADDITION OF A HYDROGEN/INERT GAS MIXTURE DURING THE SINTERING CYCLE

A further sample of the same aluminum nitride powder utilized in the above example was mixed with sintering and grinding aids, milled, and compacted as described above. The green ceramic body thus formed was close packed within a closed AlN sagger and sintered in a graphite resistance element furnace in the same manner as described in the preceding example. The following temperature and atmosphere programs were, however, employed. Temperature: 25° C./hr. to 800° C., 33° C./hr to 1000°, 80° C./hr to 1840° C., soak for 6 hrs, cooldown at a rate of 140° C./hr. The atmosphere program was as follows: Static air for 2 hrs, evacuate to 28 inches Hg, backfill with N₂ to 2-3 psig and continue to add 70 SCFH N₂ up to 1000° C., and increase the N₂ pressure to 10 psig and flow to 140 SCFH throughout the remainder of the cycle.

The resulting ceramic was light yellow in color. The specific gravity, as determined by ASTM C373.72, was 3.283 gm/cc. A second phase material, presumably yttria, is apparent as white grains in a matrix of gray grains in the photomicrographs of FIGS. 3 and 4. These grains appear as white nodes having diameters of about 0.1 to 0.4 micron, dispersed across much of FIG. 4.

The thermal diffusivity was 0.65 cm²/sec measured by conventional laser flash. The calculated thermal conductivity was 153 w/m °k where thermal conductivity equals the specific heat × the specific gravity × diffusivity × 100 and where the specific heat is 0.73 ws/gm °k as measured and as reported in the literature.

It will be understood that various changes may be made in the preferred embodiments described hereinabove without departing from the scope of the present invention. Accordingly, the preceding description should be construed as illustrative and not in a limiting sense.

We claim:

1. A process for producing sintered aluminum nitride bodies, comprising:
    (a) mixing an aluminum nitride powder with a sintering aid, the powder having a surface area of at least 2.5 m²/g, comprising at least 95% by weight aluminum nitride, and incorporating impurities in no more than the following amounts:
        (i) a bound oxygen content of no more than 3% by weight;
        (ii) metal or metal compounds in an amount of no more than 0.6% by weight, calculated as the metals, and including iron or iron compounds in an amount of no more than 0.1% by weight, calculated as iron, and/or other metals in an amount of no more than 0.1% by weight per individual metal, calculated as the metal; and
        (iii) silicon or carbon or compounds thereof in an amount of no more than 0.5% by weight, calculated as carbon or silicon;
    (b) compacting the mixture to form an aluminum nitride body; and
    (c) subjecting the body to the following sintering cycle:
        (i) increasing the temperature from room temperature to the sintering temperature at a rate of no more than 250° C. per hour;
        (ii) introducing an inert gas containing from 1 to 4% by volume hydrogen until the temperature reaches 1200° C.;
        (iii) continuing to introduce solely an inert gas as the temperature is further increased to the sintering temperature;
        (iv) sintering the body at a sintering temperature between 1600° and 1900° C.; and
        (v) cooling the sintered body at a rate of not more than 300° C. per hour.

2. The process of claim 1, wherein the surface area of the aluminum nitride powder is from 4 to 7 m²/g.

3. The process of claim 1, wherein the oxygen content in the aluminum nitride powder is no more than 2.5% by weight.

4. The process of claim 1, wherein the amount of carbon or carbon compounds in the aluminum nitride powder is no more than 0.15% by weight, calculated as carbon.

5. The process of claim 1, wherein the amount of silicon or silicon compounds in the aluminum nitride powder is no more than 0.1% by weight, calculated as silicon.

6. The process of claim 1, wherein the inert gas mixture introduced in step (c)(ii) contains from 1 to 3% by volume hydrogen, and wherein the inert gas mixture is introduced until the temperature reaches 800° C.

7. The process of claim 1, wherein the sintering temperature is within the range of from 1770° to 1850° C.

8. The process of claim 1, wherein the heating rate is between 10° and 200° C. per hour.

9. The process of claim 1, wherein the cooling rate is between 100° and 275° C. per hour.

10. The process of claim 1, wherein the sintering aid is yttrium oxide.

11. The process of claim 1, wherein the ratio of the surface area of the sintering aid to that of the aluminum nitride powder is from 2:1 to 4:1.

12. The process of claim 1, wherein the aluminum nitride powder is sintered in a firing container of aluminum nitride.

13. The process of claim 1, wherein the inert gas is introduced during the sintering cycle at a rate of from 2 to 3 SCFH and under a pressure of from 10 to 20 psig.

14. The process of claim 1, in which a binder in admixture with a solvent is added to the aluminum nitride-sintering aid mixture formed in step (a), and the resulting powder is thereafter dried.

* * * * *